Patented Sept. 13, 1932

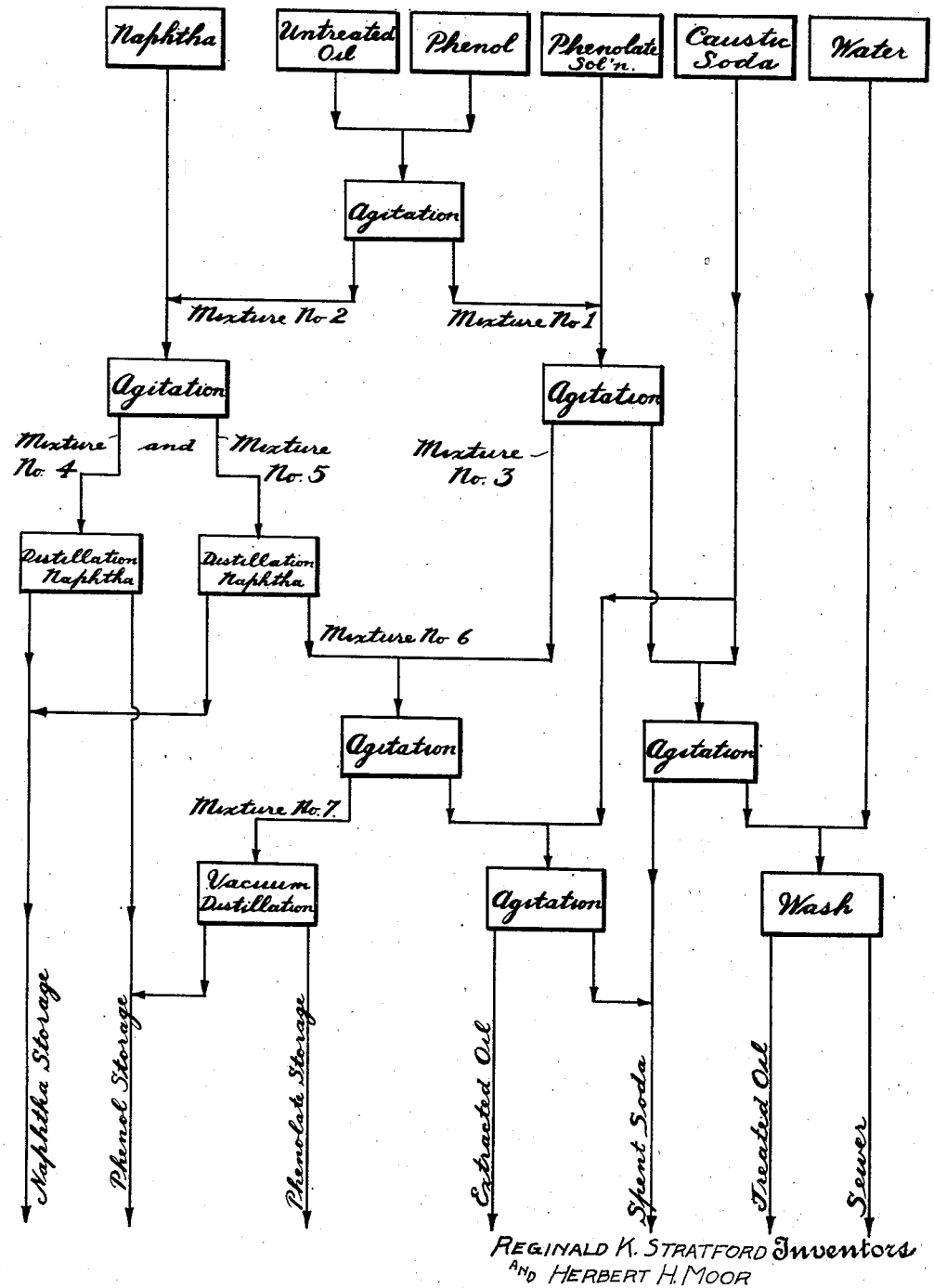

1,877,614

UNITED STATES PATENT OFFICE

REGINALD K. STRATFORD AND HERBERT H. MOOR, OF SARNIA, ONTARIO, CANADA, ASSIGNORS TO STANDARD OIL DEVELOPMENT COMPANY, A CORPORATION OF DELAWARE

PROCESS FOR PURIFYING PETROLEUM DISTILLATES WITH AQUEOUS PHENOL AND RECOVERY OF THE SAME

Application filed February 8, 1929. Serial No. 338,420.

The present invention relates to an improved process for refining oils and more specifically relates to a method for purifying petroleum distillates by the use of a selective solvent comprising phenol, together with an advantageous method for the recovery of the solvent. The invention will be fully understood from the following description and the drawing which illustrates the flow of the various liquids in the process.

The drawing is a flow sheet showing the paths of the various liquids through the process and the operations performed on the liquids and liquid mixtures.

Referring to the flow diagram, the six blocks at the upper part of the sheet refer to the various materials used in the process which will be described particularly in connection with the treatment of refined oil or kerosene. The refined oil to be treated is first agitated with a solvent comprising phenol with 5 to 15 percent of water. This solvent will hereinafter be termed phenol. The agitation may be either in batch or continuously in any suitable type of agitator or agitating system, preferably employing counter-current flow. The proportion of phenol used may vary according to the nature of the oil and the degree of improvement desired, but one to three volumes of phenol per volume of oil has been found satisfactory for many oils.

The mixture of oil and phenol separates into two immiscible layers, the one comprised largely of oil with a relatively small quantity of phenol which is designated as mixture 1, and the other comprising phenol with a relatively small quantity of oil—mixture 2.

Mixture 1 is then agitated with an aqueous solution of an alkali salt of phenol, such as sodium or potassium phenolate. The solution may be concentrated and preferably about 25% of a saturated phenolate solution is used to treat mixture 1. As before, the washing step is preferable in a continuous counter-current system. By this means practically all of the phenol is removed from the oil which is then given a lye wash and water wash, as indicated on the diagram, and may be redistilled before sending to storage for treating refined oil. The mixture of phenol and phenolate designated, 3, will be taken up below.

Mixture 2 referred to above, which comprises a large quantity of phenol and a relatively smaller quantity of extracted oil is now washed with light naphtha in an apparatus similar to that used before, and two immiscible liquid mixtures, 4 and 5, are obtained. The proportion of naphtha is about 50% of the volume of mixture 2, but it may be in greater or lesser volume if desired.

Mixture 4 is now distilled producing a distillate of naphtha which is returned for reuse and a residue of phenol which is likewise returned to the phenol storage tank. The distillation may be made in a shell or pipe still preferably fitted with a rectification column so as to reduce the quantity of phenol going overhead with the naphtha. There is no objection to about 2–4% phenol in the extracted naphtha.

Mixture 5 is also distilled to produce a naphtha distillate and a bottoms which comprises phenol and the oil extracted from the feed oil. This distillation is preferably carried out with rectification so that the naphtha may be sharply separated from the heavier oil. The naphtha returns to naphtha storage for reuse and the bottoms which is termed mixture 6 is agitated thoroughly with a solution of an alkali metal phenolate preferably in a continuous counter-current system. Mixture 3 referred to above may be used if desired. The aqueous phenolate solution separates substantially all of the phenol from the extracted hydrocarbon which may be washed or otherwise treated to remove the last traces of phenol, and may be used as a fuel, solvent, or the like, while the phenolate-phenol mixture 7 is distilled preferably under vacuum to produce a distillate of phenol which is returned to phenol storage for reuse, and a residual solution of phenolate which is returned to the phenolate storage.

In the operations of any improved process the details may be varied somewhat to suit the particular oils treated. With refined oils and light low viscosity lubricating oil, normal room temperature is preferred, but with heavier oils an elevated temperature may be used advantageously. The oil used for washing is preferably a light naphtha boiling below about 250 to 300° F.

While sodium phenolate and other alkali metal phenolates may be used, we prefer the potassium salt since it does not crystallize in the evaporator at the temperature at which phenol may be distilled. It is advantageous to add glycerine to the phenolate solution— for example, to use a mixture of about 50% by volume of glycerine, and 50% of saturated aqueous potassium or sodium phenolate. Pure concentrated glycerine may be used in place of the phenolate solution if desired.

Caustic soda used to remove the last traces of phenol from the treated oil and from the extracted oil may be used until the phenol concentration is about 90% of that required to neutralize all of the soda. The soda may be acidified with sulphuric acid to displace phenol and it may be distilled for recovery if desired.

The soda wash may be carried out at room temperature if desired, but it is preferable to use a higher temperature. For example, at about 100 to 300° F., or higher, pressure may be employed to prevent evaporation of the oil. We prefer to rerun the oil before sending to storage; and rerunning under vacuum is particularly advantageous when lubricating oils are treated.

While the method has been described particularly with reference to the treatment of refined oils, other distillates, such as lubricating oils, gas oils and the like, may be treated with equally good results.

The invention is not to be limited by any theory of the mechanism of the process, nor by any example given merely for illustration, but only by the following claims in which it is desired to claim all novelty inherent in the process.

We claim:

1. An improved process for the purification of hydrocarbon oil, comprising the steps of agitating the oil with a liquid comprising phenol and a small quantity of water, separating two immiscible liquids, the one containing a large quantity of oil and a relatively small quantity of phenol, the other containing a relatively large quantity of phenol and a small quantity of oil, agitating said first mentioned liquid with a solvent consisting of an aqueous solution of glycerine and alkali phenolate whereby phenol is substantially completely removed from the oil, and withdrawing the purified oil.

2. Process according to claim 1, in which potassium phenolate is the alkali phenolate used.

REGINALD K. STRATFORD.
HERBERT H. MOOR.